Nov. 6, 1951 R. W. SENTER 2,574,352
NUT PLACING, SLOTTED-SOCKET WRENCH
Filed Sept. 17, 1947
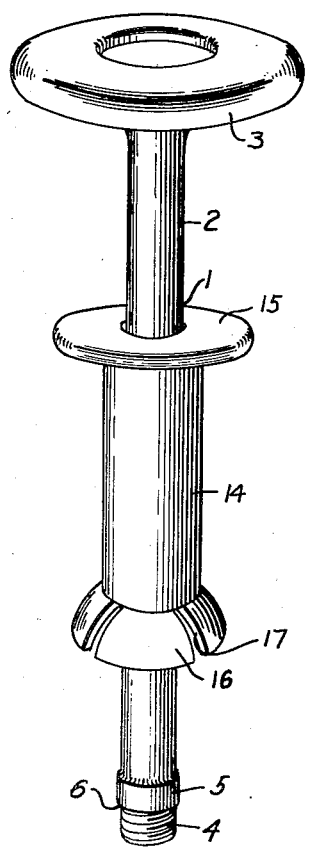
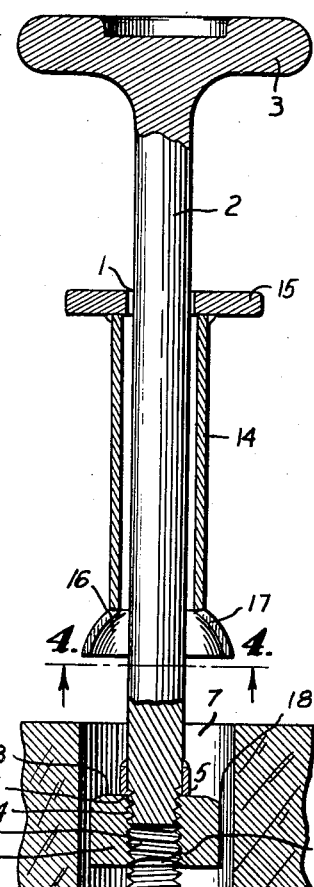
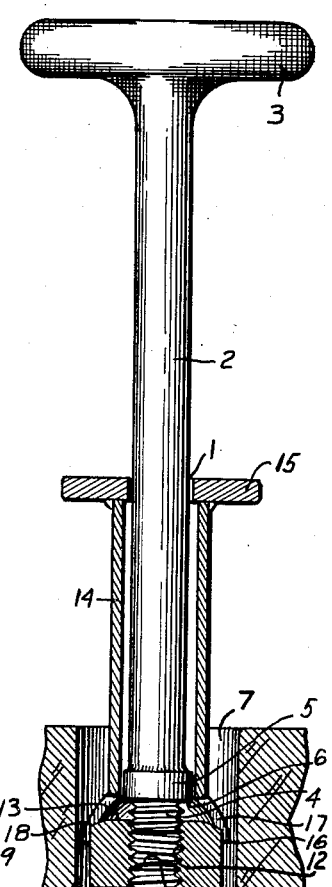
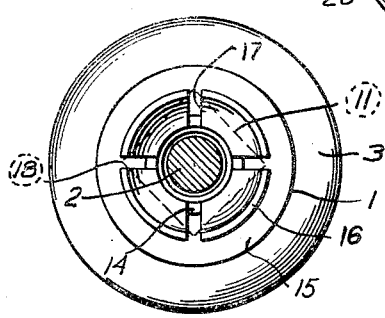
Inventor
Roy W. Senter.
By Fishburn & Mullendore
Attorneys Patented Nov. 6, 1951

2,574,352

UNITED STATES PATENT OFFICE 2,574,352

NUT PLACING SLOTTED-SOCKET WRENCH

Roy W. Senter, Topeka, Kans.

Application September 17, 1947, Serial No. 774,605

1 Claim. (Cl. 81—125)

This invention relates to a wrench, and more particularly to a wrench adapted to retain a nut thereon for placement where desired.

The principal object of the present invention is to provide a wrench for retaining a nut thereon for placement on a threaded shank of a bolt in places inaccessible to the hand of the user.

Other objects of the present invention are to provide a device having a threaded shank or end adapted to receive an internally threaded nut, the threaded shank being of a length equal to about one-half of the threads of the nut; to provide a shoulder on the shank adjacent the threads to provide a stop for the nut; to provide a sleeve on the shank having a socket adapted to engage the nut to turn the nut so that it will engage the bolt to which it is to be applied or to prevent turning of the nut for removal of the threaded shank from the nut; to provide a handle on the upper end of the shank; and to provide a device of this character simple, economical to manufacture and efficient in operation.

In accomplishing these and other objects of the present invention, I have provided improved details of structure, the preferred form of which is illustrated in the accompanying drawings, wherein:

Fig. 1 is a perspective view of my device.

Fig. 2 is a vertical elevational view partly in cross section to better illustrate the invention and showing the nut after it is attached to the bolt and the sleeve in elevated position on the shank.

Fig. 3 is a vertical elevational view partly in section showing the nut secured to the bolt and socket of the sleeve engaging nut.

Fig. 4 is a transverse cross section through the device taken on a line 4—4, Fig. 2.

Referring more in detail to the drawings:

1 designates a wrench embodying the features of my invention consisting of a shaft or rod 2 having a handle 3 on one end and provided with threads 4 on its opposite end. Adjacent the threads 4 is a ring or collar 5 rigidly secured to the shaft by welding or other suitable means. The ring 5 provides a shoulder 6 for a purpose later described.

While my device may be used for many purposes, it is particularly adaptable for placing of nuts in steel cars wherein recesses or sockets 7 are provided in the wooden ends 8 of the car. A bolt 9 extends through the ends 8 and terminates short of the opening of the recess 7 as best illustrated in Figs. 2 and 3. The end of the bolt 9 is provided with threads 10. 11 designates a nut having internal threads 12 and it will be obvious that it would be difficult to start the nut on the threads 10 of the bolt 9 by hand due to the small recess 7.

To place the nut 11 on the threads 10 of the bolt 9 the nut is threaded onto the threaded end 4 of the shaft 2 until the side face 13 thereof engages against the shoulder 6 of the ring or collar 5 so as to retain the nut on the shank of the tool. The shaft with the nut on the end may then be inserted in the recess 7 and by turning of the shank the nut 11 will engage the threads 10 of the bolt 9. By having the nut threaded on the shank it may be easily aligned with the threads on the bolt 9 so as to prevent cross threading.

When the nut is started on the threads 10 of the bolt 9, the shaft 2 of the tool may be disengaged from the nut 11 by reverse turning of the shaft and to prevent loosening of the nut 11 from the bolt 9 due to the nut having become tight on the threads 4 of the shaft 2, I provide for holding of the nut to prevent turning. For this purpose a tubular member or sleeve 14 is sleeved over the shaft 2 as illustrated in Fig. 2. The upper end of the sleeve is provided with a handle member 15 for raising and lowering the sleeve on the shaft. The opposite end of the sleeve is provided with an outwardly flared circular member 16 provided with a plurality of slots 17 forming a socket adapted to engage over the nut 11 as best illustrated in Fig. 3. While I have here illustrated a substantially square-shaped nut, it will be obvious that other shape nuts may be utilized. The corners 18 thereof are adapted to engage in the slots 17 of the socket 16 on the end of the sleeve so that the sleeve may be held from rotating by the user to hold the nut in place and the threaded end 4 of the shaft 2 removed from the nut by reverse turning of the shaft. A washer 20 is provided for the bolt 9 to fit in the recess 7.

An alternative manner of operation of the device is the nut 11 may be placed on the threaded end 4 of the shaft 2, and the shaft and nut inserted in the recess 7 so that the nut will engage the end 19 of the bolt 9 as best illustrated in Fig. 2. The sleeve 14 may then be lowered on the shaft 2 so that the socket will engage over the nut 11 and the corners 18 engage in the slots 17 of the socket. Turning of the sleeve by the hand of the operator to the right will cause the nut 11 to engage the threads 10 of the bolt 9 and by holding of the shaft 2 of the tool stationary, the nut 11 will be disengaged from the threaded end 4 of the shaft 2 so that it may be removed. While I have here shown a socket 16 on the end of the sleeve provided with slots for engaging the corners of the nut, it will be obvious that other forms of sockets may be utilized, such as sockets conforming to the shape of the nuts.

It will be obvious from the foregoing that my device may be utilized for either placement of nuts on a threaded bolt or removal of the nut from the bolt in places inaccessible to the hand of the operator. While the nut may be tightened to a certain extent on the threaded bolt 9, extreme tightening of the nut may be accomplished by the usual tightening tool (not shown) if desired.

What I claim and desire to secure by Letters Patent is:

A device for placement of an internally threaded nut having corners thereon on the threaded end of a bolt embedded in a recess comprising, a shaft having threads on one end for receiving said nut and a hand wheel on the other end for rotating said shaft to cause said nut to engage the threaded end of said bolt, a collar on said shaft adjacent said threads forming a stop for said nut, a sleeve rotatable and slidable on said shaft, said sleeve having a handhold on one end thereof, and a socket of substantially bell shape and formed integrally with the lower end of said sleeve and having longitudinal grooves therein for engaging the corners of said nut on said shaft whereby rotation of the sleeve will hold the nut on the threaded end of said bolt and permit disengagement of the shaft from the nut.

ROY W. SENTER.

REFERENCES CITED

The following references are of record in the file of this patent:

UNITED STATES PATENTS

| Number | Name | Date |
|---|---|---|
| 151,635 | Uhlinger et al. | June 2, 1874 |
| 1,321,776 | Stepanian | Nov. 11, 1919 |
| 2,357,595 | McPherson | Sept. 5, 1944 |
| 2,396,027 | Spayd | Mar. 5, 1946 |
| 2,405,462 | Stair | Aug. 4, 1946 |
| 2,461,680 | Cousino | Feb. 15, 1949 |

FOREIGN PATENTS

| Number | Country | Date |
|---|---|---|
| 1,830 | Great Britain | Jan. 23, 1912 |
| 317,421 | Italy | May 8, 1934 |